(12) United States Patent
Dong

(10) Patent No.: US 11,465,025 B2
(45) Date of Patent: Oct. 11, 2022

(54) INTELLIGENT GOLF SWING

(71) Applicant: Yuxian Jiang, Guangdong Province (CN)

(72) Inventor: Yubing Dong, Guangdong Province (CN)

(73) Assignee: Yuxian Jiang, Guangdong Province (CN)

( * ) Notice: Subject to any disclaimer, the term of this patent is extended or adjusted under 35 U.S.C. 154(b) by 0 days.

(21) Appl. No.: 17/367,601

(22) Filed: Jul. 5, 2021

(65) Prior Publication Data

US 2022/0032153 A1 Feb. 3, 2022

(30) Foreign Application Priority Data

Jul. 31, 2020 (CN) .......................... 202010754931.6

(51) Int. Cl.
   *A63B 69/36* (2006.01)

(52) U.S. Cl.
   CPC ...... *A63B 69/3632* (2013.01); *A63B 69/3621* (2020.08); *A63B 2225/74* (2020.08)

(58) Field of Classification Search
   CPC ............ A63B 69/3632; A63B 69/3621; A63B 2225/74; A63B 69/3614; A63B 2071/0647; A63B 2071/0694; A63B 71/0622; A63B 15/00; A63B 69/36
   USPC ................................................ 473/220, 222
   See application file for complete search history.

(56) References Cited

U.S. PATENT DOCUMENTS

| 5,161,802 | A  | * | 11/1992 | Daechsel | A63B 69/3614 |
|   |   |   |   |   | 473/220 |
| 5,299,802 | A  | * | 4/1994 | Bouchet-Lassale | ... A63B 49/08 |
|   |   |   |   |   | 273/DIG. 30 |
| 5,873,789 | A  | * | 2/1999 | Torriano | A63B 69/3614 |
|   |   |   |   |   | 473/220 |
| 6,254,493 | B1 | * | 7/2001 | Wurster | A63B 69/3614 |
|   |   |   |   |   | 473/220 |
| 8,998,739 | B2 | * | 4/2015 | Haight | A63B 69/3623 |
|   |   |   |   |   | 473/409 |
| 2004/0023726 | A1 | * | 2/2004 | Ritson | A63B 21/4035 |
|   |   |   |   |   | 473/220 |
| 2011/0244975 | A1 | * | 10/2011 | Farmer | A63B 69/3614 |
|   |   |   |   |   | 473/224 |

FOREIGN PATENT DOCUMENTS

WO     WO-2010067917 A1 *  6/2010  ........... A63B 15/005

* cited by examiner

*Primary Examiner* — Nini F Legesse
(74) *Attorney, Agent, or Firm* — CKC & Partners Co., LLC

(57) ABSTRACT

An intelligent golf swing includes a swing body, a top spotlight device and a lower spotlight device. The swing body includes a middle rod and a lower rod. The lower rod is installed at the bottom end of the middle rod. The lower rod and the middle rod are arranged in a straight line. The top spotlight device is fixedly installed at the top end of the middle rod. The top spotlight device includes a spotlight and a switch. The lower spotlight device is fixedly installed on the lower rod. The lower spotlight device includes a lampwick and a button switch. A light emitted by the lampwick is allowed to be emitted from the bottom end of the lower rod, and the aforementioned light, the swing body, the lower rod and the middle rod are located on the same straight line.

3 Claims, 3 Drawing Sheets

INTELLIGENT GOLF SWING

RELATED APPLICATIONS

This application claims priority to China Application Serial Number 202010754931.6, filed Jul. 31, 2020, which is herein incorporated by reference.

BACKGROUND

Field of Disclosure

The disclosure relates to an apparatus for practicing golf.

Description of Related Art

At present, golf has become the interest of more and more people. The traditional golf swing has simple structure and single function, and has not any auxiliary device to help practitioners practice golf scientifically and effectively.

The action of playing golf is very important to play golf well. Although a coach can guide us professionally, we can't take the coach with us at any time. Therefore, it's urgent to design an intelligent golf swing to meet the needs of efficient practice and playing at any time and at any place.

SUMMARY

The technical problem that the present disclosure needs to overcome the defect that traditional golf swing has no auxiliary practicing device and is difficult to practice golf alone, then to provide an intelligent golf swing which is equipped with an auxiliary practicing device to help practitioners practice golf scientifically and effectively.

In order to solve the above technical problem, the present disclosure puts forward the following technical solution. An intelligent golf swing includes a swing body, a top spotlight device and a lower spotlight device. The swing body includes a middle rod and a lower rod. The lower rod is installed at the bottom end of the middle rod. The lower rod and the middle rod are arranged in a straight line. The top spotlight device is fixedly installed at a top end of the middle rod. The top spotlight device includes a spotlight and a switch. The lower spotlight device is fixedly installed on the lower rod. The lower spotlight device includes a lampwick and a button switch. The lampwick is allowed to emit a straight light from a bottom end of the lower rod, and the straight light of the lampwick, the swing body, the lower rod and the middle rod are located on the same straight line.

In one embodiment of the disclosure, the further improvement of the technical solution is that the middle rod includes a left middle rod housing and a right middle rod housing; an upper part of the left middle rod housing is provided with a left hand holding part; a left connecting column protrudes downward from a bottom of the left middle rod housing; a left connecting groove is excavated inward from the upper part of the left connecting column; the upper part of the right middle rod housing is provided with a right hand holding part; a right connecting column protrudes downward from a bottom of the right middle rod housing; a right connecting groove is excavated inward from the upper part of the right connecting column; the left middle rod housing and the right middle rod housing are assembled and installed to form the aforementioned middle rod; the left hand holding part and the right hand holding part form a holding part, and the left connecting column and the right connecting column form a connecting column, and the left connecting groove and the right connecting groove form a connecting groove; the lower rod includes a left lower rod housing and a right lower rod housing; a left mounting part protrudes from the inner wall of the top of the left lower rod housing; a right mounting part protrudes from the inner wall of the top of the right lower rod housing; the left lower rod housing and the right lower rod housing are assembled and installed to form the aforementioned lower rod, and the left mounting part and the right mounting part are correspondingly clamped into the connecting groove of the middle rod, so the lower rod is installed and fixed to the bottom end of the middle rod.

In one embodiment of the disclosure, the further improvement of the technical solution is that the left connecting column is the left half of a hexagonal prism after cutting off the right half along the normal direction; the right connecting column is the right half of a hexagonal prism after cutting off the left half along the normal direction; the connecting column is hexagon shaped.

In one embodiment of the disclosure, the further improvement of the technical solution is that the left middle rod housing and the right middle rod housing are respectively provided with several screw holes; the left middle rod housing and the right middle rod housing are assembled and installed by several bolts to form the aforementioned middle rod.

In one embodiment of the disclosure, the further improvement of the technical solution is that the left lower rod housing is a semicircular shell, and the right lower rod housing is a semicircular shell.

In one embodiment of the disclosure, the further improvement of the technical solution is that the left lower rod housing and the right lower rod housing are respectively provided with several screw holes; the left lower rod housing and the right lower rod housing are assembled and installed by several bolts to form the aforementioned lower rod.

In one embodiment of the disclosure, the further improvement of the technical solution is that the top spotlight device is fixedly installed at the top end of the middle rod; the top spotlight device includes a fastening screw, a knob, a left knob fixing part, a right knob fixing part, a chip, a battery; the fastening screw is fixedly installed at the top of the middle rod; the knob is mounted on the fastening screw; the left knob fixing part and the right knob fixing part are assembled to form a hollow knob fixing part; the knob fixing part is rotatably mounted on the knob; the chip, the battery, the spotlight and the switch are electrically connected, and they are all installed in the knob fixing part.

In one embodiment of the disclosure, the further improvement of the technical solution is that the top spotlight device is fixedly installed at the top end of the middle rod; the top spotlight device comprises a fastening screw, a knob, a left knob fixing part, a right knob fixing part, a chip, a battery; the fastening screw is fixedly installed at the top of the middle rod; the knob is mounted on the fastening screw; the left knob fixing part and the right knob fixing part are assembled to form a hollow knob fixing part; the knob fixing part is rotatably mounted on the knob; and the chip, the battery, the spotlight and the switch are electrically connected, and they are all installed in the knob fixing part.

In one embodiment of the disclosure, the further improvement of the technical solution is that the lower spotlight device includes a battery; and the lampwick, the battery and the button switch are electrically connected, and are all installed in the lower rod.

In one embodiment of the disclosure, the further improvement of the technical solution is that the intelligent golf swing furtherly includes a weight-increasing device; the weight-increasing device is arranged at the lower end of the lower rod; the weight-increasing device includes a box, at least two heavy loads and at least a spring; the box includes a left box and a right box; the left box extends from the lower portion of the left lower rod housing; the right box extends from the lower portion of the right lower rod housing; the left box and the right box are assembled and installed to form the aforementioned box; the at least two heavy loads are installed in the box; the at least a spring is mounted in the box between the at least two heavy loads.

The intelligent golf swing in accordance with the present disclosure has many advantages than prior arts. According to the intelligent golf swing, whether the swing track of a user is correct or not can be checked by the user; adjustment can be conducted at any time under the assistance of the top spotlight device and the lower spotlight device, and therefore the golf practicing and playing efficiency is improved. Also, the intelligent golf swing is very convenient to carry, and can be used for practicing at any place, such as offices, at home, outdoor competitions and the like.

The above description is merely used for illustrating the problems to be resolved, the technical methods for resolving the problems and their efficacies, etc. The specific details of the disclosure will be explained in the embodiments below and related drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Figure 1:
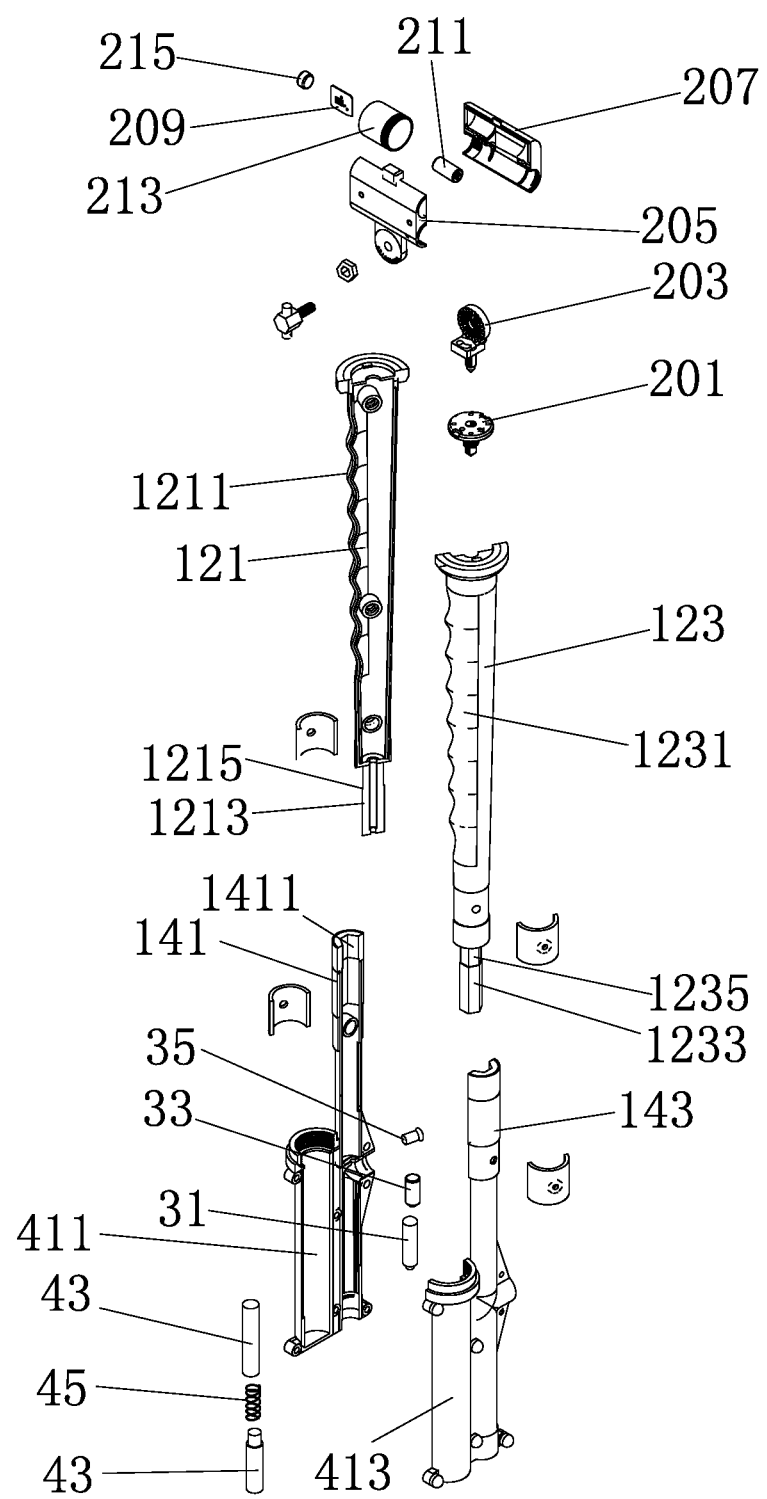
FIG. 1 is a three-dimensional decomposition drawing of the intelligent golf swing of the disclosure.

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the disclosure without departing from the scope or spirit of the disclosure.

Figure 2:
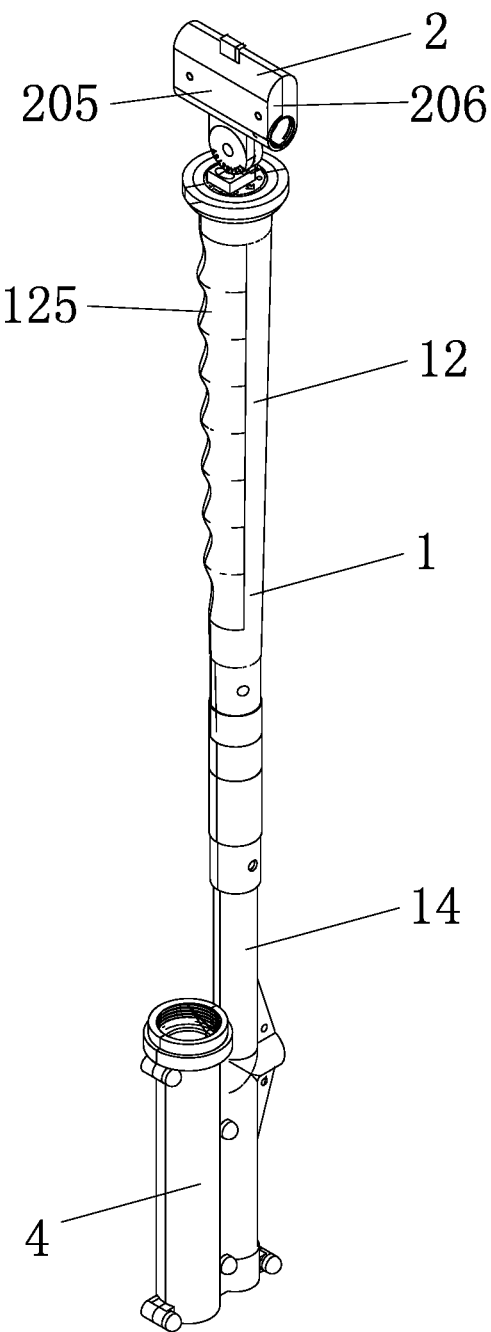
FIG. 2 is a three-dimensional assembly drawing of the intelligent golf swing of the disclosure.
Figure 3:
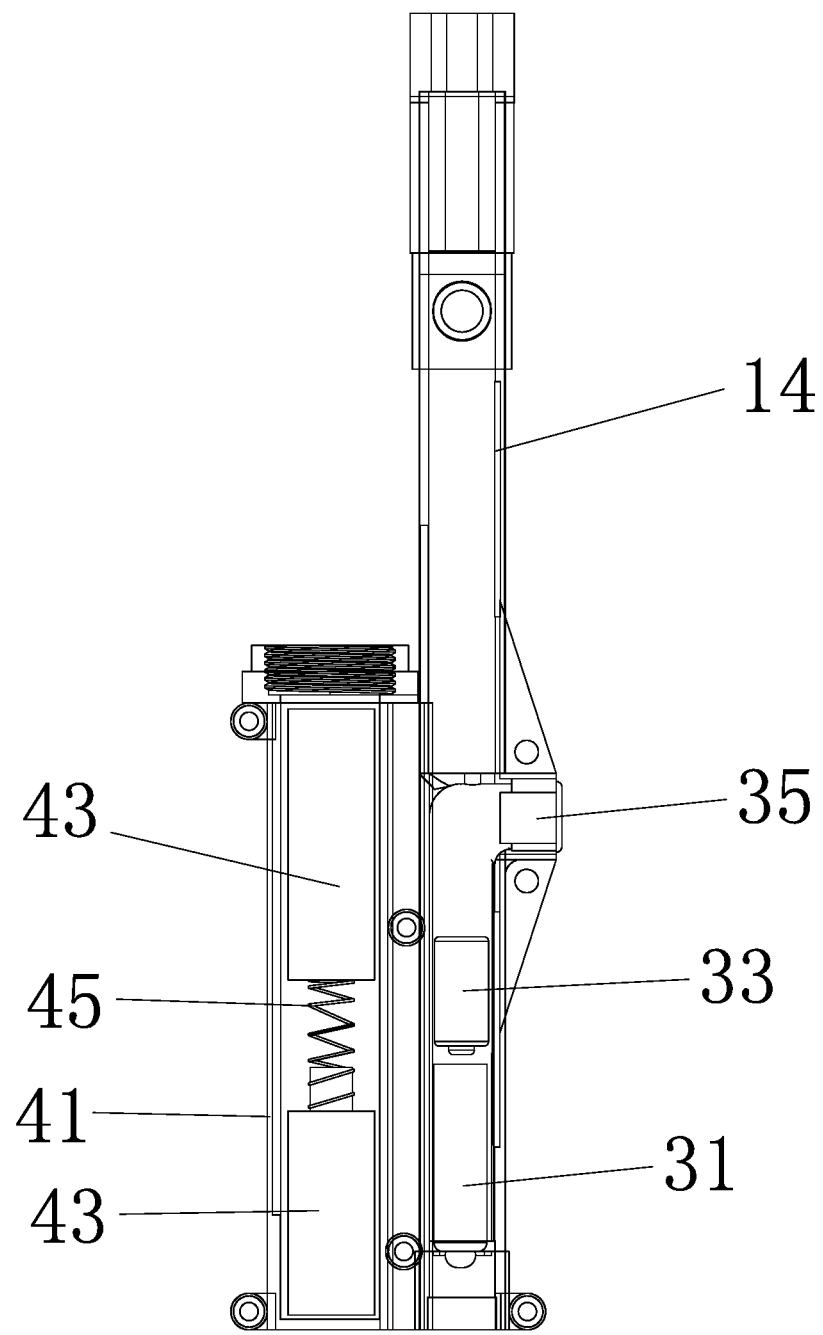
FIG. 3 is a sectional view of the lower rod, the lower spotlight device and the weight-increasing device.

Reference is now made to FIG. 1 to FIG. 3, as shown in FIG. 1 and FIG. 2, As shown in FIG. 1 to FIG. 3, an intelligent golf swing includes a swing body 1, a top spotlight device 2 and a lower spotlight device (not marked in drawings) and a weight-increasing device 4.

The swing body 1 includes a middle rod 12 and a lower rod 14.

The lower rod 14 is installed at the bottom end of the middle rod 12.

The lower rod 14 and the middle rod 12 are arranged in a straight line.

The middle rod 12 includes a left middle rod housing 121 and a right middle rod housing 123. The upper part of the left middle rod housing 121 is provided with a left hand holding part 1211.

A left connecting column 1213 protrudes downward from the bottom of the left middle rod housing 121.

The left connecting column 1213 is the left half of a hexagonal prism after cutting off the right half along the normal direction.

A left connecting groove 1215 is excavated inward from the upper part of the left connecting column 1213.

The upper part of the right middle rod housing 123 is provided with a right hand holding part 1231.

A right connecting column 1233 protrudes downward from the bottom of the right middle rod housing 123.

The right connecting column 1233 is the right half of a hexagonal prism after cutting off the left half along the normal (vertical) direction.

A right connecting groove 1235 is excavated inward from the upper part of the right connecting column 1233.

The left middle rod housing 121 and the right middle rod housing 123 are respectively provided with several screw holes (not marked in drawings). The left middle rod housing 121 and the right middle rod housing 123 are assembled and installed by several bolts (not marked in drawings) to form the aforementioned middle rod 12. The left hand holding part 1211 and the right hand holding part 1231 form a complete holding part 125, and the left connecting column 1213 and the right connecting column 1233 form a complete hexagon shaped connecting column (not marked in drawings), and the left connecting groove 1215 and the right connecting groove 1235 form a connecting groove (not marked in drawings).

The lower rod 14 includes a left lower rod housing 141 and a right lower rod housing 143.

The left lower rod housing 141 is a semicircular shell, and a left mounting part 1411 protrudes from the inner wall of the top of the left lower rod housing 141.

The right lower rod housing 143 is a semicircular shell, and a right mounting part (not marked in drawings) protrudes from the inner wall of the top of the right lower rod housing 143.

Place the left lower rod housing 141 and the right lower rod housing 143 on both sides of the connecting column (not marked in drawings), so that the left mounting part 1411 and the right mounting part (not marked in drawings) are clamped into the connecting groove (not marked in drawings). The left lower rod housing 141 and the right lower rod housing 143 are respectively provided with several screw holes (not marked in drawings). The left lower rod housing 141 and the right lower rod housing 143 are assembled and installed by several bolts (not marked in drawings) to form the aforementioned lower rod 14. Because the left mounting part 1411 and the right mounting part (not marked in drawings) are correspondingly clamped into the connecting groove (not marked in drawings) of the middle rod 12, the lower rod 14 is installed and fixed to the bottom end of the middle rod 12.

The top spotlight device 2 is fixedly installed at the top end of the middle rod 12.

The top spotlight device 2 includes a fastening screw 201, a knob 203, a left knob fixing part 205, a right knob fixing part 207, a chip 209, a battery 211, a spotlight 213 and a switch 215.

The fastening screw 201 is fixedly installed at the top of the middle rod 12.

The knob 203 is mounted on the fastening screw 201.

The left knob fixing part 205 and the right knob fixing part 207 are assembled to form a hollow knob fixing part 206.

The knob fixing part 206 is rotatably mounted on the knob 203. When the knob fixing part 206 is pulled, the knob fixing part 206 and the knob 203 rotate relatively. When the pulling is stopped, the knob fixing part 206 is fixed in a new position.

The chip 209, the battery 211, the spotlight 213 and the switch 215 are electrically connected, and they are all installed in the knob fixing part 206.

The switch 215 is exposed outside the knob fixing part 206 for convenient operation.

Press the switch 215 to turn on the spotlight 213, and press the switch 215 again to turn off the spotlight 213.

The lower spotlight device (not marked in drawings) is fixedly installed on the lower rod 14.

The lower spotlight device (not marked in drawings) includes a lampwick 31, a battery 33 and a button switch 35. For example, the lampwick 31 is a laser led or similar component.

The lampwick 31, the battery 33 and the button switch 35 are electrically connected, and they are all installed in the lower rod 14.

Light (e.g., straight light) emitted by the lampwick 31 is emitted from the bottom end of the lower rod 14. The aforementioned light, the swing body 1, the lower rod 14 and the middle rod 12 are located on the same straight line.

The button switch 35 is exposed outside the lower rod 14 for convenient operation.

Press the button switch 35 to turn on the lampwick 31, and press the button switch 35 again to turn off the lampwick 31.

The weight-increasing device 4 is arranged at the lower end of the lower rod 14.

The weight-increasing device 4 includes a box 41, two heavy loads 43 and a spring 45.

The box 41 includes a left box 411 and a right box 413.

The left box 411 extends from the lower portion of the left lower rod housing 141.

The right box 413 extends from the lower portion of the right lower rod housing 143.

After the left lower rod housing 141 and the right lower rod housing 143 are assembled and installed together, the left box 411 and the right box 413 are assembled and installed to form the aforementioned box 41.

The two heavy loads 43 are installed in the box 41.

The spring 45 is mounted in the box 41 between the two heavy loads 43.

When using the intelligent golf swing of the disclosure, turn on the spotlight 213 of the top spotlight device 2 and the lampwick 31 of the aforementioned lower spotlight device (not marked in drawings), the user clenches the holding part 125 with both hands, raises the swing, makes the lower rod 14 located behind the user's shoulder and back, and makes the light emitted by the spotlight 213 aim at the golf ball on the ground, and this is the preparation posture (It's called "backswing") before hitting the ball.

With the help of the spotlight 213, it can help the user master the correct "backswing" posture and improve golf ball skills.

After the "backswing" posture is set, then swing down to hit a golf ball. While swinging, the light emitted from the lampwick 31 will draw a beam of light on the ground. If the light passes through the golf ball, it means that the intelligent golf swing can hit the golf ball smoothly.

Because the length of the intelligent golf swing of the disclosure is shorter than that of the traditional golf swing, the lower rod 14 cannot actually hit the golf ball, so the intelligent golf swing can be used in any places (including indoor places) to practice golf.

Because the weight of the intelligent golf swing of the disclosure is lighter than that of the traditional golf swing, a weight-increasing device 4 is arranged to enable the user to practice golf according to the actual weight of traditional golf swing and improve golf ball skills.

The intelligent golf swing of the disclosure can be carried around to practice golf efficiently anytime and anywhere. The user of the intelligent golf swing can check whether its swing track is correct by itself, and make some adjustment at any time with the assistance of the top spotlight device 2 and the lower spotlight device, so as to improve the efficiency of practice golf and play golf.

Although the disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An intelligent golf swing device comprising a swing body, a top spotlight device and a lower spotlight device;
the swing body comprising a middle rod and a lower rod;
the lower rod being installed at a bottom end of the middle rod;
the lower rod and the middle rod being arranged in a straight line;
the top spotlight device being fixedly installed at a top end of the middle rod;
the top spotlight device comprising a spotlight, a switch, a fastening screw, a knob, a left knob fixing part, a right knob fixing part, a chip and a battery;
the fastening screw being fixedly installed at a top of the middle rod;
the knob being mounted on the fastening screw;
the left knob fixing part and the right knob fixing part being assembled to form a hollow knob fixing part;
the knob fixing part being rotatably mounted on the knob;
the chip, the battery, the spotlight and the switch being electrically connected, and they being all installed in the knob fixing part;
the lower spotlight device being fixedly installed on the lower rod;
the lower spotlight device comprising a lampwick and a button switch;
light emitted by the lampwick being emitted from a bottom end of the lower rod; and
the forementioned light, the swing body, the lower rod and the middle rod being located on the same straight line.

2. An intelligent golf swing device comprising a swing body, a top spotlight device and a lower spotlight device;
the swing body comprising a middle rod and a lower rod;
the middle rod comprising a left middle rod housing and a right middle rod housing;
an upper part of the left middle rod housing being provided with a left hand holding part;
a left connecting column protruding downward from the bottom of the left middle rod housing;
a left connecting groove being excavated inward from an upper part of the left connecting column;
an upper part of the right middle rod housing being provided with a right hand holding part;

a right connecting column protruding downward from the bottom of the right middle rod housing;

a right connecting groove being excavated inward from an upper part of the right connecting column;

the left middle rod housing and the right middle rod housing being assembled and installed to form the forementioned middle rod;

the left hand holding part and the right hand holding part forming a holding part, and the left connecting column and the right connecting column forming a connecting column, and the left connecting groove and the right connecting groove forming a connecting groove;

the lower rod comprising a left lower rod housing and a right lower rod housing;

a left mounting part protruding from an inner wall of a top of the left lower rod housing;

a right mounting part protruding from the inner wall of a top of the right lower rod housing;

the left lower rod housing and the right lower rod housing being assembled and installed to form the forementioned lower rod, and the left mounting part and the right mounting part being correspondingly clamped into the connecting groove of the middle rod, so the lower rod being installed and fixed to a bottom end of the middle rod;

the lower rod being installed at the bottom end of the middle rod;

the lower rod and the middle rod being arranged in a straight line;

the top spotlight device being fixedly installed at a top end of the middle rod;

the top spotlight device comprising a spotlight, a switch, a fastening screw, a knob, a left knob fixing part, a right knob fixing part, a chip and a battery;

the fastening screw being fixedly installed at a top of the middle rod;

the knob being mounted on the fastening screw;

the left knob fixing part and the right knob fixing part being assembled to form a hollow knob fixing part;

the knob fixing part being rotatably mounted on the knob;

the chip, the battery, the spotlight and the switch being electrically connected, and they being all installed in the knob fixing part;

the lower spotlight device being fixedly installed on the lower rod;

the lower spotlight device comprising a lampwick and a button switch;

light emitted by the lampwick being emitted from a bottom end of the lower rod;

the forementioned light, the swing body, the lower rod and the middle rod being located on the same straight line.

3. An intelligent golf swing device comprising a swing body, a top spotlight device, a lower spotlight device and a weight-increasing device;

the swing body comprising a middle rod and a lower rod;
the middle rod comprising a left middle rod housing and a right middle rod housing;
an upper part of the left middle rod housing being provided with a left hand holding part;
a left connecting column protruding downward from the bottom of the left middle rod housing;
a left connecting groove being excavated inward from an upper part of the left connecting column;
an upper part of the right middle rod housing being provided with a right hand holding part;
a right connecting column protruding downward from the bottom of the right middle rod housing;
a right connecting groove being excavated inward from an upper part of the right connecting column;
the left middle rod housing and the right middle rod housing being assembled and installed to form the forementioned middle rod;
the left hand holding part and the right hand holding part forming a holding part, and the left connecting column and the right connecting column forming a connecting column, and the left connecting groove and the right connecting groove forming a connecting groove;
the lower rod comprising a left lower rod housing and a right lower rod housing;
a left mounting part protruding from the inner wall of a top of the left lower rod housing;
a right mounting part protruding from the inner wall of a top of the right lower rod housing;
the left lower rod housing and the right lower rod housing being assembled and installed to form the forementioned lower rod, and the left mounting part and the right mounting part being correspondingly clamped into the connecting groove of the middle rod, so the lower rod being installed and fixed to a bottom end of the middle rod;
the lower rod being installed at the bottom end of the middle rod;
the lower rod and the middle rod being arranged in a straight line;
the top spotlight device being fixedly installed at a top end of the middle rod;
the top spotlight device comprising a spotlight and a switch;
the lower spotlight device being fixedly installed on the lower rod;
the lower spotlight device comprising a lampwick and a button switch;
light emitted by the lampwick being emitted from a bottom end of the lower rod;
the forementioned light, the swing body, the lower rod and the middle rod being located on the same straight line;
the weight-increasing device being arranged at a lower end of the lower rod;
the weight-increasing device comprising a box, at least two heavy loads and at least a spring;
the box comprising a left box and a right box;
the left box extending from a lower portion of the left lower rod housing;
the right box extending from a lower portion of the right lower rod housing;
the left box and the right box being assembled and installed to form the forementioned box;
the at least two heavy loads being installed in the box; and
the at least a spring being mounted in the box between the at least two heavy loads.

* * * * *